P. B. Tyler,
Saw Teeth,
N° 10,940.  Patented May 16, 1854.

UNITED STATES PATENT OFFICE.

PHILOS B. TYLER, OF SPRINGFIELD, MASSACHUSETTS.

METHOD OF NIBBING SAW-TEETH.

Specification of Letters Patent No. 10,940, dated May 16, 1854.

*To all whom it may concern:*

Be it known that I, PHILOS B. TYLER, of Springfield, in the county of Hampden and State of Massachusetts, have invented a new and useful Improvement in Saws; and I do hereby declare that the same is fully described and represented in the following specification and the accompanying drawings, letters, figures, and references thereof.

Figure 1:
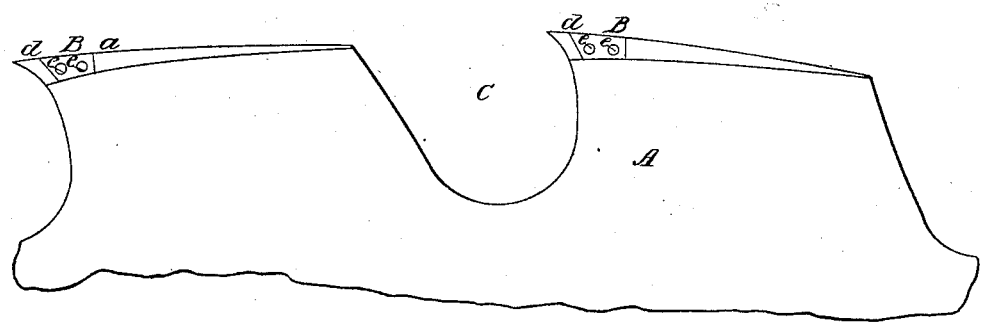
Figure 2:
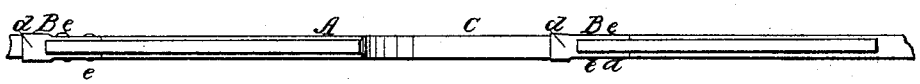
Figure 3:
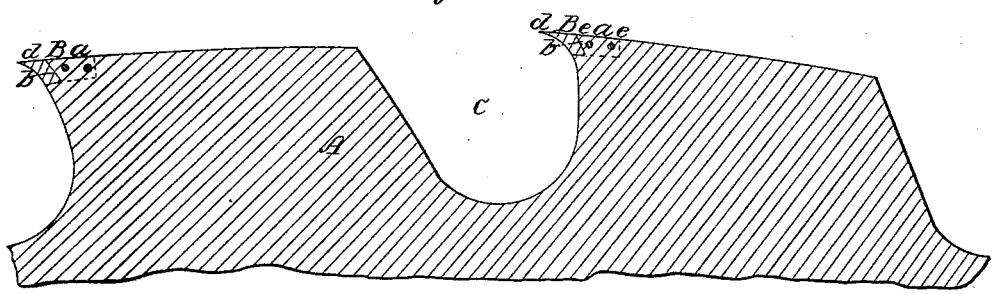

Of the said drawings, Figure 1, represents a side view of a portion of a saw blade having my invention applied to it, such portion of said saw blade exhibiting two of the saw teeth. Fig. 2, is an edge view of the same. Fig. 3, is a longitudinal section of it.

The general principles of my invention consist in furnishing the teeth of saws with points or nibs of hardened steel, and of sufficient breadth of cutting edge, to relieve the body of the saw from friction while the saw is in use; these nibs being attached to the saw by means of a projecting rib and an inclined seat or angular notch, rivets and projections from the nibs as will be hereinafter explained. The points or nibs may have what is usually termed diamond shaped or angular edges or be made diagonal to the plane of the saw or be at right angles with it as circumstances may require.

In the drawings, A denotes a portion of the body of a larger saw, such as is generally used in saw-mills for sawing logs. B, B, are two of the teeth of said saw and, C, is the throat of the rearmost one of said teeth. I make each tooth with a projecting rib, *a*, extended from its inner edge and formed of a less width than the thickness of the tooth as seen in the drawings. This projecting rib, I form with an inclined front end or angular notch as seen at *b*, the said rib and notch being for the purpose of receiving and holding a separate and detachable hardened steel cutting nib or point, *d*, which is made to rest within the notch and to embrace the rib and bear against the front end of the rib and be fastened to the rib by rivets, *e, e*. The cutting edge or front part of the cutting nib is made wider than the length of the rivets or the width of the saw blade and projects a little beyond the saw blade on each side of it whereby the saw blade during the passage of the cutting nib into a log of wood is relieved from much friction and this on account of the saw kerf being formed by the cutting nib being wider than thickness of the same blade. The inclined front edge of the rib before mentioned serves as a great support to the detachable nib, prevented the strain upon the nib while the saw is in use from breaking off the rivets.

The particular object of my invention is to supply the tooth of the saw with a hardened steel point or cutting nib capable of being detached from or attached to the tooth—one, which by means of machinery could be cheaply made and when once worn too much for use, could be removed and have a new one substituted at a trifling expense in comparison to what usually results from repairing the teeth of a saw in the ordinary way.

By having a hardened steel nib as above set forth, its shape can be maintained to better advantage, and by replacing the nib injuriously worn, the main tooth of the saw to which such is applied will be preserved, and a shape can be given to it so as to always insure a proper degree of strength and stiffness, such as could not be maintained were the tooth continually subjected to being filed away, as it is under the ordinary process of sharpening its cutting edge.

I am aware that whole teeth have been inserted in saws, but such practical objections have arisen to these as have prevented them from being successfully used for they soon become weakened at the roots, where perfect stiffness is required.

By the employment of the hardened detachable nib the size of the saw is always preserved, all the sharpening of such nibs that may be required may be effected by a simple oil stone. When the nibs become too blunt or obtuse they may be removed by cutting off the heads of the rivets with a chisel and removing the rivets and substituting new or fresh nibs. These nibs can be made by machinery and be furnished at a less cost than the files used in the filing of an ordinary saw and a set of nibs can be removed and another set put in its place in less time than is usually required any morning in putting a mill saw in order for the day. With a hardened nib the tooth will stand for a long time without the necessity of sharpening, and by means of the very acute angular chisel edge which the hardened nib will always afford to the saw the strain upon the saw will not be near so great (while the saw is in use) as is produced upon the saw after its teeth have been worn or filed up in the ordinary way.

I do not claim the making a saw with detachable teeth, where the whole of each tooth is constructed in one piece and detachable from the body or plate of the saw, but What I do claim as my invention is, The improved mode of making and fitting each tooth, the cutting nib of it being made so as not only to embrace a rib made in the tooth or body of the saw, but to rest in any angular notch formed as stated at the front of the rib, the nib being secured in place by rivets as specified.

In testimony whereof I have hereunto set my signature this twenty first day of March A. D. 1854.

PHILOS B. TYLER.

Witnesses:
 O. A. SEAMANS,
 SAMUEL J. ROSS.